(12) United States Patent
Keller et al.

(10) Patent No.: US 12,372,623 B2
(45) Date of Patent: *Jul. 29, 2025

(54) CONIC MICRO-ELECTRO-MECHANICAL SYSTEM (MEMS) MICRO-MIRROR ARRAY (MMA) STEERED ACTIVE SITUATIONAL AWARENESS SENSOR

(71) Applicant: Raytheon Company, Arlington, VA (US)

(72) Inventors: Sean D. Keller, Tucson, AZ (US); Gerald P. Uyeno, Tucson, AZ (US); Benn H. Gleason, Tucson, AZ (US)

(73) Assignee: Raytheon Company, Arlington, VA (US)

( * ) Notice: Subject to any disclaimer, the term of this patent is extended or adjusted under 35 U.S.C. 154(b) by 1110 days.

This patent is subject to a terminal disclaimer.

(21) Appl. No.: 17/177,784

(22) Filed: Feb. 17, 2021

(65) Prior Publication Data

US 2022/0260685 A1 Aug. 18, 2022

(51) Int. Cl.
*G01S 7/481* (2006.01)
*G01S 17/04* (2020.01)
*G02B 26/08* (2006.01)

(52) U.S. Cl.
CPC ............ *G01S 7/4817* (2013.01); *G01S 17/04* (2020.01); *G02B 26/0833* (2013.01)

(58) Field of Classification Search
CPC .... G01S 7/4817; G01S 17/04; G02B 26/0833
(Continued)

(56) References Cited

U.S. PATENT DOCUMENTS 5,404,375 A   4/1995  Kroeger et al.
5,854,702 A   12/1998 Ishikawa et al.
(Continued)

FOREIGN PATENT DOCUMENTS

DE  102011104023.8 B4   7/2019
EP  2667142 A1          11/2013
(Continued)

OTHER PUBLICATIONS

"MEMS Mirror Array—Beam Steering Mode", [Online]. Retrieved from the Internet: <www.youtube.com/watch?v=wHIUU3kKtzM>, (Aug. 10, 2017), 2 pgs.
(Continued)

*Primary Examiner* — Daniel L Murphy
(74) *Attorney, Agent, or Firm* — Schwegman Lundberg & Woessner, P.A.

(57) ABSTRACT

An active situational sensor uses a beam steerer to steer a spot-beam onto a conical shape of a fixed mirror oriented along an optical axis to scan a FOR. The sensor may rapidly scan a 360° horizontal FOR with a specified vertical FOR or any portion thereof, move discretely between multiple specific objects per frame, vary the dwell time on an object or compensate for other external factors to tailor the scan to a particular application or changing conditions in real-time. The fixed mirror includes a MEMS MMA that approximates the conical shape of the mirror. The MEMS MMA being configurable to extend the vertical FOR or shape the spot-beam to adjust size, focus or intensity profile or to produce deviations in the wavefront of the spot-beam to compensate for path length differences or atmospheric distortion. The MEMS MMA being configurable to produce and independently steer a plurality of spot-beams of the same or different wavelengths.

17 Claims, 13 Drawing Sheets

(58) Field of Classification Search
USPC .................................................. 356/5.01
See application file for complete search history.

(56) References Cited

U.S. PATENT DOCUMENTS

| | | | |
|---|---|---|---|
| 6,181,450 B1 | 1/2001 | Dishman et al. |
| 6,271,953 B1 | 8/2001 | Dishman et al. |
| 6,327,063 B1 | 12/2001 | Rockwell |
| 6,567,574 B1 | 5/2003 | Ma et al. |
| 6,792,028 B2 | 9/2004 | Cook et al. |
| 7,304,296 B2 | 12/2007 | Mills et al. |
| 7,593,641 B2 | 9/2009 | Tegge, Jr. |
| 7,626,152 B2 | 12/2009 | King et al. |
| 7,660,235 B2 | 2/2010 | Alicherry et al. |
| 7,667,190 B2 | 2/2010 | Mills et al. |
| 7,969,558 B2 | 6/2011 | Hall |
| 8,164,037 B2 | 4/2012 | Jenkins et al. |
| 8,301,027 B2 | 10/2012 | Shaw et al. |
| 8,305,578 B1 | 11/2012 | Mudge et al. |
| 8,311,372 B2 | 11/2012 | Anderson et al. |
| 8,368,889 B2 | 2/2013 | Schwiegerling et al. |
| 8,380,025 B2 | 2/2013 | Anderson et al. |
| 8,463,080 B1 | 6/2013 | Anderson et al. |
| 8,767,190 B2 | 7/2014 | Hall |
| 8,823,848 B2 | 9/2014 | Chipman et al. |
| 8,983,293 B2 | 3/2015 | Frankel et al. |
| 9,473,768 B2 | 10/2016 | Uyeno et al. |
| 9,477,135 B1 | 10/2016 | Uyeno et al. |
| 9,632,166 B2 | 4/2017 | Trail et al. |
| 9,857,226 B2 | 1/2018 | LeMaster et al. |
| 9,904,081 B2 | 2/2018 | Uyeno et al. |
| 9,927,515 B2 | 3/2018 | Keller et al. |
| 10,148,056 B2 | 12/2018 | Uyeno et al. |
| 10,209,439 B2 | 2/2019 | Keller et al. |
| 10,243,654 B1 | 3/2019 | Uyeno et al. |
| 10,267,915 B2 | 4/2019 | Uyeno et al. |
| 10,381,701 B2 | 8/2019 | Motoi |
| 10,444,492 B2 | 10/2019 | Hopkins et al. |
| 10,718,491 B1 | 7/2020 | Raring et al. |
| 10,969,598 B2 | 4/2021 | Fest et al. |
| 10,998,965 B2 | 5/2021 | Tong et al. |
| 11,042,025 B2 | 6/2021 | Uyeno et al. |
| 11,333,879 B2 | 5/2022 | Uyeno et al. |
| 12,025,790 B2 * | 7/2024 | Keller ................... G01S 7/4817 |
| 12,117,607 B2 * | 10/2024 | Gleason ................... G02B 5/10 |
| 2002/0141689 A1 | 10/2002 | Qian et al. |
| 2002/0196506 A1 | 12/2002 | Graves et al. |
| 2003/0062468 A1 | 4/2003 | Byren et al. |
| 2003/0081321 A1 | 5/2003 | Moon et al. |
| 2003/0185488 A1 | 10/2003 | Blumenthal |
| 2004/0072540 A1 | 4/2004 | Wilson et al. |
| 2004/0081466 A1 | 4/2004 | Walther et al. |
| 2004/0141752 A1 | 7/2004 | Shelton et al. |
| 2004/0258415 A1 | 12/2004 | Boone et al. |
| 2005/0031255 A1 | 2/2005 | Schroeder et al. |
| 2005/0100339 A1 | 5/2005 | Tegge |
| 2005/0122566 A1 | 6/2005 | Cicchiello |
| 2005/0288031 A1 | 12/2005 | Davis et al. |
| 2006/0038103 A1 | 2/2006 | Helmbrecht |
| 2006/0245033 A1 | 11/2006 | Baba-ali et al. |
| 2007/0031157 A1 | 2/2007 | Yamada et al. |
| 2007/0036480 A1 | 2/2007 | Wu |
| 2008/0050064 A1 | 2/2008 | Sakai et al. |
| 2008/0130090 A1 | 6/2008 | Aubuchon |
| 2010/0149533 A1 | 6/2010 | Fest |
| 2010/0166430 A1 | 7/2010 | Alten |
| 2010/0192941 A1 | 8/2010 | Stoia et al. |
| 2012/0002973 A1 | 1/2012 | Bruzzi et al. |
| 2012/0008133 A1 | 1/2012 | Silny et al. |
| 2012/0103065 A1 | 5/2012 | Muehleisen |
| 2012/0114337 A1 | 5/2012 | Aoki |
| 2012/0155885 A1 | 6/2012 | Hannah et al. |
| 2012/0168605 A1 | 7/2012 | Milanovic |
| 2013/0271818 A1 | 10/2013 | Bastien et al. |
| 2014/0063299 A1 | 3/2014 | Fest et al. |
| 2015/0099476 A1 | 4/2015 | Beals |
| 2015/0172218 A1 | 6/2015 | Beshai |
| 2015/0311981 A1 | 10/2015 | Inagaki et al. |
| 2015/0378242 A1 | 12/2015 | Auxier et al. |
| 2016/0003677 A1 | 1/2016 | Pezzaniti et al. |
| 2016/0043800 A1 | 2/2016 | Kingsbury et al. |
| 2016/0234703 A1 | 8/2016 | Aldana et al. |
| 2016/0294472 A1 | 10/2016 | Palmer et al. |
| 2017/0293137 A1 | 10/2017 | Zhao et al. |
| 2017/0365970 A1 | 12/2017 | Uyeno et al. |
| 2018/0231715 A1 | 8/2018 | Bishop et al. |
| 2019/0066320 A1 | 2/2019 | Uyeno et al. |
| 2019/0154921 A1 | 5/2019 | Xing et al. |
| 2020/0166430 A1 | 5/2020 | Bradbury et al. |
| 2020/0244359 A1 | 7/2020 | Csonka et al. |
| 2021/0088776 A1 | 3/2021 | Uyeno et al. |
| 2021/0091854 A1 | 3/2021 | Uyeno et al. |
| 2021/0092260 A1 | 3/2021 | Uyeno et al. |
| 2022/0236383 A1 | 7/2022 | Uyeno et al. |
| 2022/0260827 A1 | 8/2022 | Keller et al. |
| 2022/0350133 A1 | 11/2022 | Gleason et al. |

FOREIGN PATENT DOCUMENTS

| | | |
|---|---|---|
| EP | 2533003 B1 | 8/2018 |
| WO | WO-2014200581 A2 | 12/2014 |

OTHER PUBLICATIONS

Rodriguez, et al., "Beam steering by digital micro-mirror device for multi-beam and single-chip lidar", Proc. SPIE 10757, Optical Data Storage 2018: Industrial Optical Devices and Systems, (Sep. 14, 2018), 7 pgs.

Ryf, et al., "MEMS tip/tilt and piston mirror arrays as diffractive optical elements", Proc. SPIE 5894, Advanced Wavefront Control: Methods, Devices, and Applications III, (Aug. 30, 2005), 12 pgs.

Tsou, et al., "Extended-image spatial tracking technique for deep-space optical downlinks", Proc. SPIE 3762, Adaptive Optics Systems and Technology, (Sep. 27, 1999), 101-109.

Tuantranont, et al., "Optical beam steering using MEMS-controllable microlens array", Sensors and Actuators A: Physical vol. 91, Issue 3, (Jul. 15, 2001), 363-372.

"U.S. Appl. No. 17/177,755, Non Final Office Action mailed Sep. 21, 2023", 5 pgs.

"U.S. Appl. No. 17/177,755, Response filed Dec. 20, 2023 to Non Final Office Action mailed Sep. 21, 2023", 8 pgs.

"U.S. Appl. No. 17/177,755, Notice of Allowance mailed Feb. 22, 2024", 8 pgs.

"U.S. Appl. No. 17/159,967, Non Final Office Action mailed Apr. 24, 2024", 21 pgs.

"U.S. Appl. No. 16/871,602, Non Final Office Action mailed Nov. 9, 2020", 18 pgs.

"U.S. Appl. No. 16/871,602, Notice of Allowance mailed Feb. 24, 2021", 5 pgs.

"U.S. Appl. No. 16/871,602, Response filed Feb. 8, 2021 to Non Final Office Action mailed Nov. 9, 2020", 12 pgs.

"U.S. Appl. No. 17/007,917, Non Final Office Action mailed Aug. 3, 2021", 35 pgs.

"U.S. Appl. No. 17/007,917, Response filed Dec. 1, 2021 to Non Final Office Action mailed Aug. 3, 2021", 16 pgs.

"High Contrast IR Wire Grid Polarizers", Edmund Optics, [Online]. Retrieved from the Internet: <URL: https://www.edmundoptics.com/f/high-contrast-ir-wire-grid-polarizers/14797/>, (Accessed Sep. 4, 2021), 1 pg.

"Mid-Wave Infrared (MWIR) and Long-Wave Infrared (LWIF) Waveplates", Edmund Optics, [Online]. Retrieved from the Internet: <URL: https://www.edmundoptics.com/f/mid-wave-infrared-mwir-and-long-wave-infrared-lwir-waveplates/14317/>, (Accessed Sep. 4, 2021), 2 pgs.

"Mirrorcle Technologies MEMS Mirrors—Technical Overview", Mirrorcle Technologies, Inc., (2018), 7 pgs.

Ayral, J.-L., et al., "Phase-conjugate Nd:YAG laser with internal acousto-optic beam steering", Optics Letters, vol. 16, No. 16, (Aug. 15, 1991), 1225-1227.

(56) References Cited

OTHER PUBLICATIONS

Chiu, Yi, et al., "Shape-Optimized Electrooptic Beam Scanners: Analysis, Design, and Simulation", Journal of Lightwave Technology, vol. 17, No. 1, (Jan. 1999), 108-114.

Kim, et al., "Demonstration of large-angle nonmechanical laser beam steering based on LC polymer polarization grating", Proc.. of SPIE vol. 8052 80520T, (May 13, 2011).

Kim, Jihwan, et al., "Wide-angle, nonmechanical beam steering using thin liquid crystal polarization gratings", Proc. of SPIE, vol. 7093, (2008), 12 pgs.

King, D F, et al., "3rd-Generation 1280×720 FPA development status at Raytheon Vision Systems", Proc. of SPIE vol. 6206 62060W-1, (2006), 16 pgs.

Norton, Andrew, et al., "High-Power Visible-Laser Effect on a 37-Segment Iris AO Deformable Mirror", Proc. SPIE 7595, MEMS Adaptive Optics IV, 759506, (Feb. 17, 2010), 12 pgs.

Salmon, J.T., et al., "An Adaptive Optics System for Solid-State Laser Systems used in Inertial Confinement Fusion", First Annual International Conference on Solid-State Lasers for Application of Intertial Confinement Fusion, Monterey, California, May 30-Jun. 2, 1995, (Sep. 17, 1995), 13 pgs.

Wang, Jinxue, et al., "Doppler Winds Lidar Technology Development and Demonstration", AIAA-2005-6772, Space 2005, Long Beach, California, Aug. 30-1, 2005, 11 pgs.

Yamamoto, R., et al., "Evolution of a Solid State Laser", Proc. SPIE 6552, Laser Source Technology for Defense and Security III, 655205, (May 10, 2007), 11 pgs.

"U.S. Appl. No. 17/159,967, Response filed Jun. 27, 2024 to Non Final Office Action mailed Apr. 24, 2024", 10 pgs.

"U.S. Appl. No. 17/159,967, Final Office Action mailed Jul. 16, 2024", 18 pgs.

"U.S. Appl. No. 17/159,967, Response filed Aug. 27, 2024 to Final Office Action mailed Jul. 16, 2024", 12 pgs.

"U.S. Appl. No. 17/159,967, Advisory Action mailed Sep. 5, 2024", 3 pgs.

"U.S. Appl. No. 17/159,967, Non Final Office Action mailed Nov. 7, 2024", 23 pgs.

Phillip, A. Himmer, "Off-axis variable focus and aberration control mirrors", Proc. SPIE 4985, MOEMS Display and Imaging Systems, [Online]. Retrieved from the Internet: https: doi.Org 10.1117 12.477815, (2003).

"U.S. Appl. No. 17/007,917, Notice of Allowance mailed Jan. 10, 2022", 14 pgs.

"U.S. Appl. No. 17/007,917, Supplemental Notice of Allowability mailed Apr. 19, 2022", 2 pgs.

\* cited by examiner

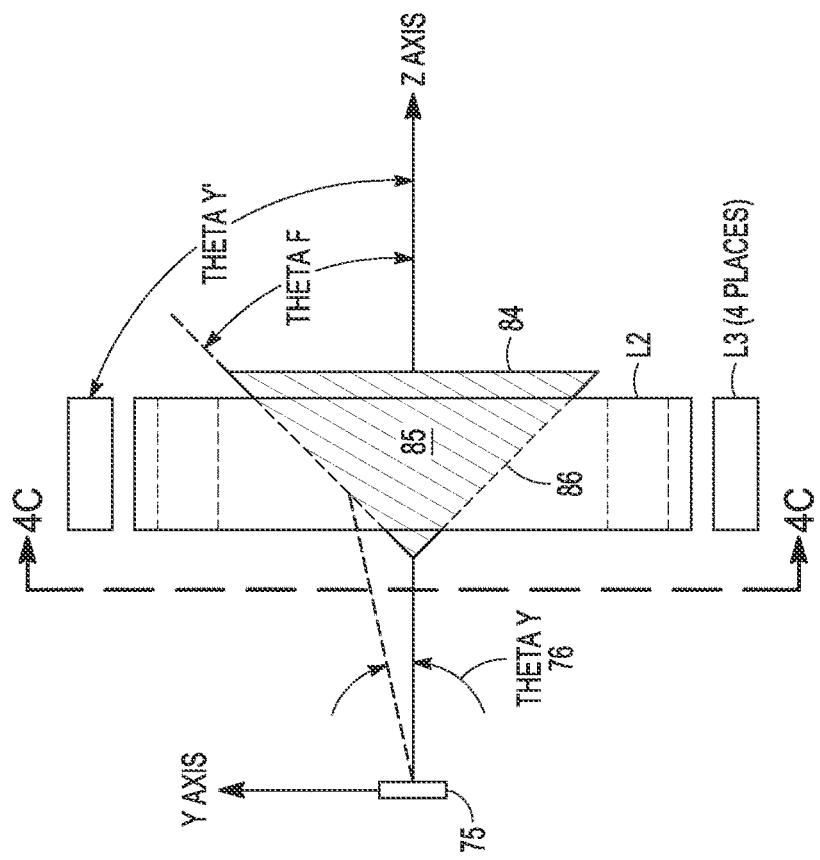
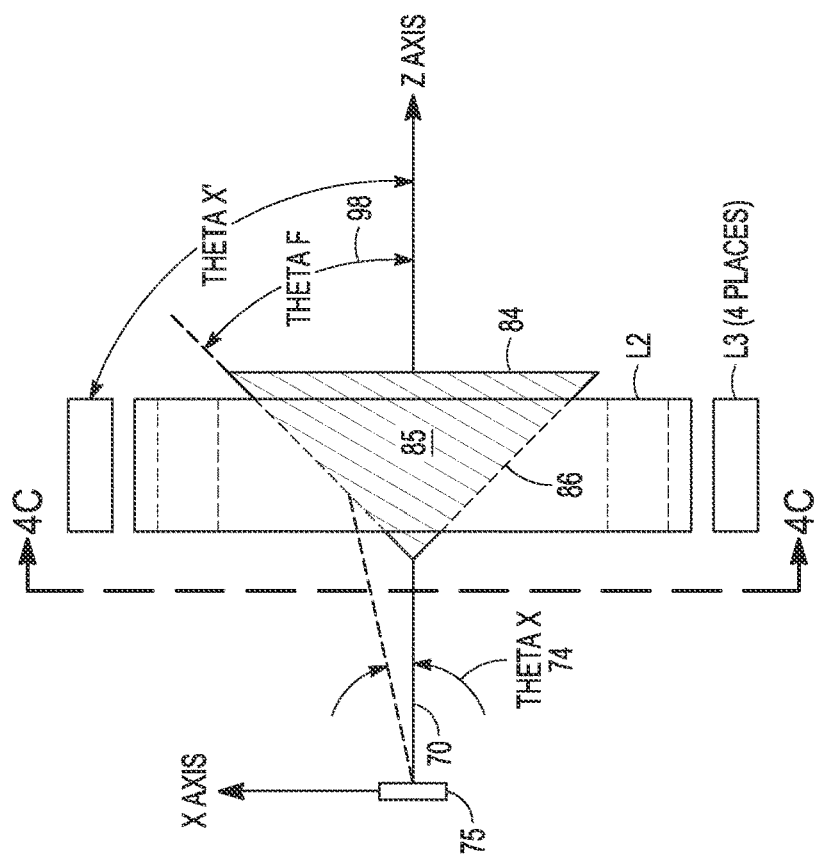
FIG. 4A
FIG. 4B

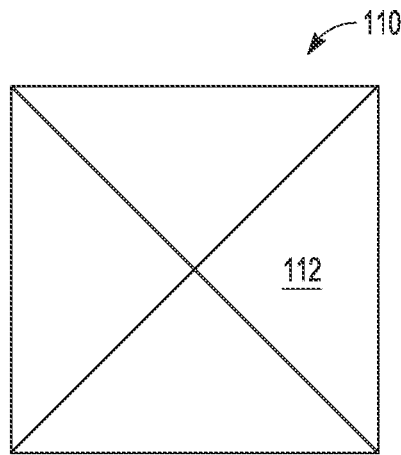
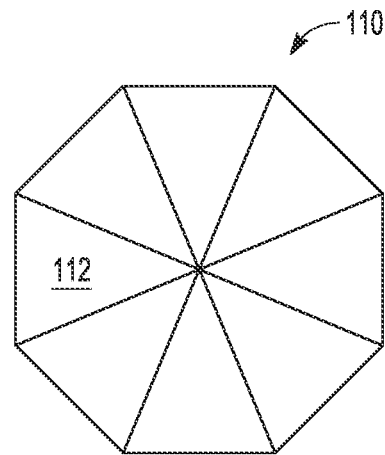
FIG. 6A  FIG. 6B
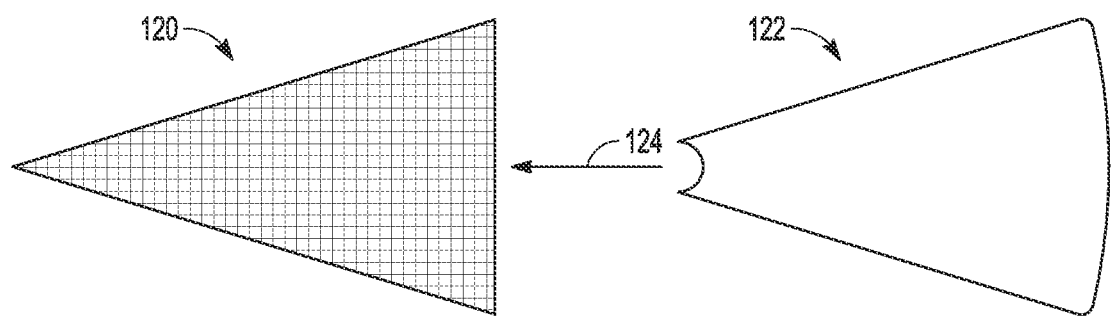
FIG. 7

CONIC MICRO-ELECTRO-MECHANICAL SYSTEM (MEMS) MICRO-MIRROR ARRAY (MMA) STEERED ACTIVE SITUATIONAL AWARENESS SENSOR

BACKGROUND OF THE INVENTION

Field of the Invention

This invention relates to situational awareness sensors, and more particularly to the use of a Micro-Electro-Mechanical System (MEMS) Micro-Mirror Array (MMA) to steer a laser spot-beam over a sensor field-of-regard (FOR).

Description of the Related Art

Situational awareness is the perception of environmental elements with respect to time or space, the comprehension of their meaning, and the projection of their status after some variable has changed, such as time, or some other variable, such as a predetermined event. Situational awareness is critical in complex, dynamic systems such as aviation, air traffic control, ship navigation, collision avoidance, object targeting, etc.

Situational awareness sensors may be passive or active. Passive sensors use a detector and ambient energy to detect and track objects in the sensor's FOR. Active sensors use a laser to illuminate objects in the FOR and a detector to detect reflected energy. The active sensor may be configured to produce an intensity image or a range map of the illuminated object. Active sensors have the advantages of illuminating a target with a laser and being able to provide range information. However, lasers can be large and expensive and raise the overall "SWaP-C" (size, weight, power and cost) of the sensor.

One type of active sensor uses flash illumination to simultaneously illuminate the entire FOR and a pixelated detector to detect reflected energy. This approach requires a laser with a lot of power, hence size, weight and cost, to provide the requisite power density over the FOR to detect objects at typical distances. Flash illumination also produces atmospheric backscatter that reduces the signal-to-noise ratio (SNR) of the detected objects. Flash illumination does have the benefit of no moving parts.

Another type of active sensor uses a single laser to generate a collimated spot-beam. A mirror is physically rotated to scan the collimated spot-beam over a 360 degree horizontal FOR. The entire sensor may be pointed up and down to scan a desired vertical FOR. A single detector senses a reflected component of the spot-beam. This approach can use a less powerful laser and avoids atmospheric backscattering but is mechanically scanned.

Velodyne Lidar offers a suite of LIDAR sensors that provide a 360 degree horizontal FOR and a 30-40 degree vertical FOR for real-time autonomous navigation, 3D mobile mappig and other LIDAR applications (U.S. Pat. Nos. 7,969,558 and 8,767,190). The LIDAR sensor includes a base, a housing, a plurality of photon transmitters and photon detectors contained within the housing, a rotary motor that rotates the housing about the base, and a communication component that allows transmission of signals generated by the photon detectors to external components. The photon transmitters and detectors of each pair are held in a fixed relationship with each other. The rotary component includes a rotary power coupling configured to provide power from an external source to the rotary motor, the photon transmitters, and the photon detectors. This approach uses many small emitter/detector pairs but requires mechanical rotation to scan the horizontal FOV.

U.S. Pat. No. 9,927,515 entitled "Liquid Crystal Waveguide Steered Active Situational Awareness Sensor" discloses the use of a liquid crystal waveguide to steer a spot-beam onto a conical shape of a fixed mirror, which redirects the spot-beam to scan a FOR. The sensor may rapidly scan a 360° horizontal FOR with a specified vertical FOR or any portion thereof, move discretely between multiple specific objects per frame in which information is read out from the detector on a frame-by-frame basis, vary the dwell time on an object or compensate for other external factors to tailor the scan to a particular application or changing real-time conditions.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides an active situational awareness sensor that achieves SWaP-C and SNR improvements. The sensor may be positioned in any horizontal or vertical direction and may rapidly scan a 360° horizontal FOR in the plane (XY) perpendicular to the axis (Z) of the sensor and an extended vertical FOR perpendicular to the plane of the scan. More generally, the sensor scans, either serially or simultaneously a FOR in a first angular direction around its optical axis and a second angular direction along its optical axis. The sensor may also scan any portion of the FOR, move between multiple discrete objects per frame, vary the dwell time on an object or compensate for other external factors to tailor the scan to a particular application or changing conditions in real-time. The sensor can be easily configured to address different wavelength bands without having to re-design the sensor material system or to recalibrate the steering commands. The sensor can generate, focus and independently steer one or more spot-beams spanning a diversity of wavelengths. The sensor can further shape the one or more spot-beams to adjust spot size, divergence/convergence, intensity profile, optical power, perform wavefront correction or maintain a zero phase difference across the beam.

In an embodiment, a situational awareness sensor comprises a laser (CW or pulsed) configured to generate a beam of optical radiation, a fixed mirror having a conical shape oriented along an optical axis, and a beam steerer responsive to command signals to focus the optical radiation into a spot-beam on the conical shape of the fixed mirror and steer the spot-beam in two-dimensions about the optical axis to re-direct the spot-beam to scan a field-of-regard (FOR) in a first angular direction around the optical axis. The fixed mirror comprises a Micro-Electro-Mechanical System (MEMS) Micro-Mirror Array (MMA) including a plurality of mirrors that in combination approximate the conical shape. The mirrors are responsive to command signals to tip and tilt to scan the spot-beam in a second angular direction along the optical axis to expand the FOR in the second angular direction. A detector is configured to sense a reflected component of the spot-beam.

The beam steerer may be of an analog nature selected from one of a gimbaled mirror, a liquid crystal waveguide (LCWG) or a MEMS MMA or a discrete nature such as provided by an N-port optical switch. In the later case the fixed mirror's MMA also tip and tilt to scan the spot-beam in the first angular direction between the discrete scan angles addressed by the N-port optical switch.

The fixed mirror may comprises N (at least three) triangular-shaped planar MEMS MMAs configured to form an N-sided pyramid that approximates the conic shape of the fixed mirror. Alternately, the fixed mirror may comprise one or more MEMS MMA formed on a flexible substrate and wrapped on a conic mandrel to approximate the conic shape of the fixed mirror.

The mirrors of the fixed mirror's MEMS MMA may be configured to tip, tilt and piston to both shape and scan the spot-beam over the FOR. Each mirror rotates about X and Y axes, which are orthogonal to each other, to tip and tilt and translates in a Z axis orthogonal to the XY plane to piston, respectively. The mirrors may be configured to at least partially collimate the spot-beam thereby reducing (or eliminating) additional optical elements in the sensor. The mirrors may also be configured to adjust a size divergence or intensity profile of the spot-beam, approximate continuous steering surfaces or produce deviations in the wavefront of the spot-beam to compensate for atmospheric distortion or path length differences.

The fixed mirror's MEMS MMA may be partitioned into a plurality of segments illuminated by the spot-beam, each segment including at least one mirror. The MEMS MMA is responsive to tip and tilt the mirrors in each segment to separate the spot-beam into a plurality of spot-beams to scan the FOR.

In an embodiment, the beam steerer steers the spot-beam to a location Theta X and Theta Y from the optical axis onto the fixed mirror. Theta X is the angle between the projection of the instantaneous location of the axis of the spot-beam on the X-Z plane and the Z-axis and Theta Y is the angle between the instantaneous location of the axis of the spot-beam on the Y-Z plane and the Z-axis. Theta Z is the angle between the projection of the instantaneous location of the axis of the steered spot-beam and the Z axis. The conical shape of the fixed mirror redirects the spot-beam to a location Phi (a first angular direction) and Theta Z' (a second angular direction) where Phi is the angle between the projection of the instantaneous location of the axis of the redirected spot-beam on the X-Y plane and the X-axis and Theta Z' is the angle between the projection of the instantaneous location of the axis of the redirected spot-beam on the Z-axis. Theta Z' is greater than Theta Z. The redirected spot-beam scans a field-of-regard (FOR) defined by the values of Phi and Theta Z'. The fixed mirror's MEMS MMA may scan the spot-beam to expand the FOR in Theta Z'. In the case of discrete beam steerer, the fixed mirror's MEMS MMA may scan the spot-beam in Phi between the discrete angles in Phi addressed by the beam steerer to provide a continuous FOR in Phi. In certain standard conventions, the first angular direction Phi is also referred to as the Azimuth angle and the second angular direction Theta Z' is also referred to as the Elevation angle.

In different embodiments, the sensor may include different combinations of optical components L2 and L3. Optic L2 is configured to collimate the redirected spot-beam. Optic L3 is configured to direct the collimated redirected spot-beam through a discrete aperture. In an embodiment, N optical channels are spaced every 360/N degrees around the circumference of the conical shape. Each channel includes an Optic L2 and Optic L3 that guide the redirected spot-beam through a discrete aperture in a support member to scan 360/N degrees of the FOR. The fixed mirror's MEMS MMA may tip, tilt and piston to provide a portion or all of the beam collimation provided by optics L2 and L3 thereby reducing the demands on those elements or eliminating them altogether.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 4A-4D are top, side, and section views of the situational awareness sensor of FIG. 3;

FIGS. 6A-6B are illustrations of 4-sided and 8-sided pyramids formed of triangular-shaped planar MEMS MMAs that approximate the conic shape of the fixed mirror;

FIG. 7 is an illustration of one or more MEMS MMAs formed on a flexible substrate that is wrapped around a conic mandrel to approximate the conic shape of the fixed mirror;

FIGS. 10A-10C are illustrations of partitioning the fixed mirror's MEMS MMA into multiple segments to form and multiple spot-beams over the FOR.

DETAILED DESCRIPTION OF THE INVENTION

The present invention provides an active situational sensor that steers a spot-beam around a fixed mirror with a conical shape to scan a FOR in a first angular direction around the sensor's optical axis. A Micro-Electro-Mechanical System (MEMS) Micro-Mirror Array (MMA) includes a plurality of mirrors that in combination approximate the conical shape and tip and tilt to scan the spot-beam in a second angular direction along the optical axis to expand the FOR in the second angular direction. The sensor may rapidly scan a 360° horizontal FOR and an extended vertical FOR or any portion thereof, move discretely between multiple specific objects per frame, vary the dwell time on an object or compensate for other external factors to tailor the scan to a particular application or changing conditions in real-time. The axis of the sensor may be positioned in any horizontal or vertical direction and the sensor may rapidly scan a 360° FOR in the plane perpendicular to the axis of the sensor with a specified vertical FOR perpendicular to the plane of the scan. The plane perpendicular to the axis of the sensor is referred to as the "horizontal plane" in the remainder of this document, however, this plane does not have to be oriented horizontal (perpendicular to the direction of gravity), for the sensor to function. The sensor can be easily configured to address different wavelength bands without having to re-design the sensor material system or to recalibrate the steering commands. The sensor can generate, focus and independently steer one or more spot-beams spanning a diversity of wavelengths. The sensor can further shape the one or more spot-beams to adjust spot size, divergence/convergence, intensity profile, optical power, perform wavefront correction or maintain a zero phase difference across the beam. The sensor can be used to provide object intensity or ranging in complex, dynamic systems such as aviation, air traffic control, ship navigation, unmanned ground vehicles, collision avoidance, object targeting, etc.

Figure 1:
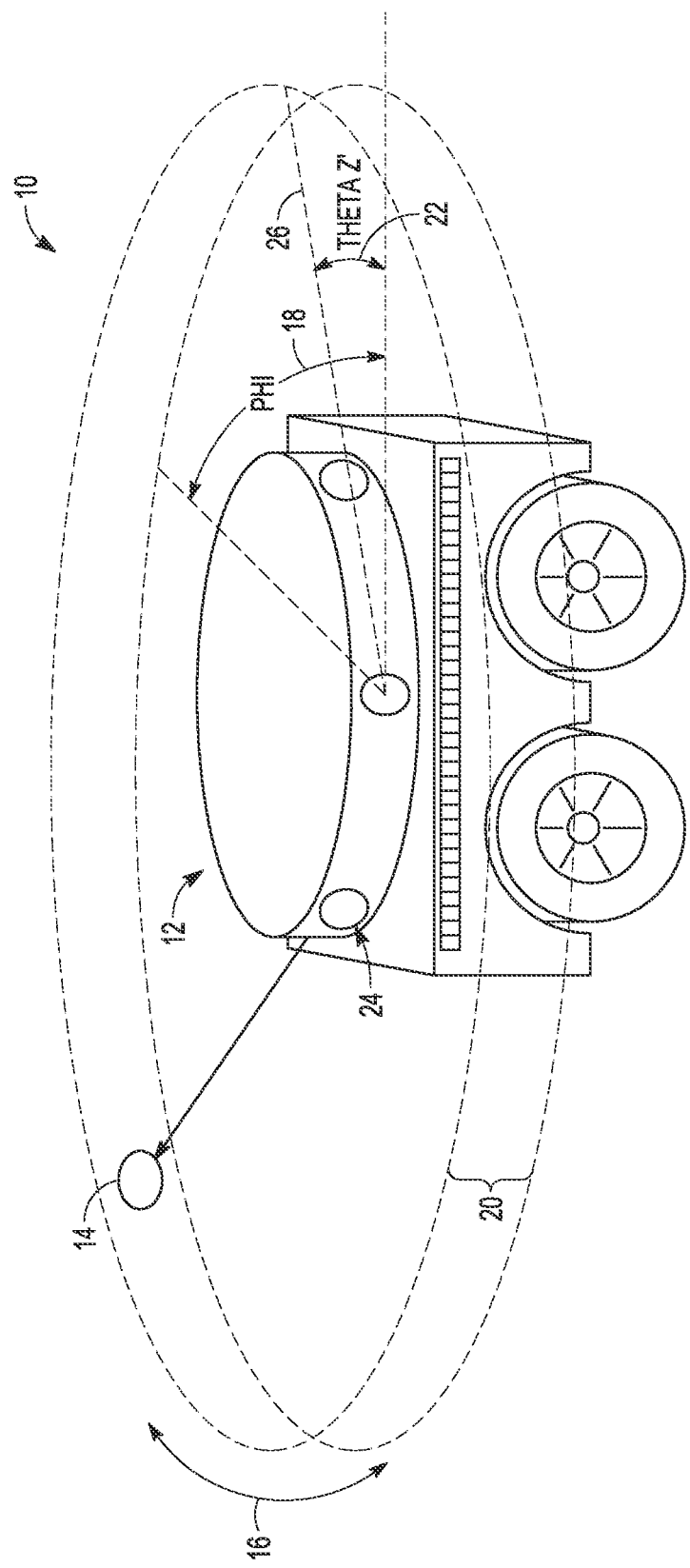
FIG. 1 is a diagram of an unmanned ground vehicle (UGV) provided with a actively steered situational awareness sensor of the present invention.
Figure 2A:
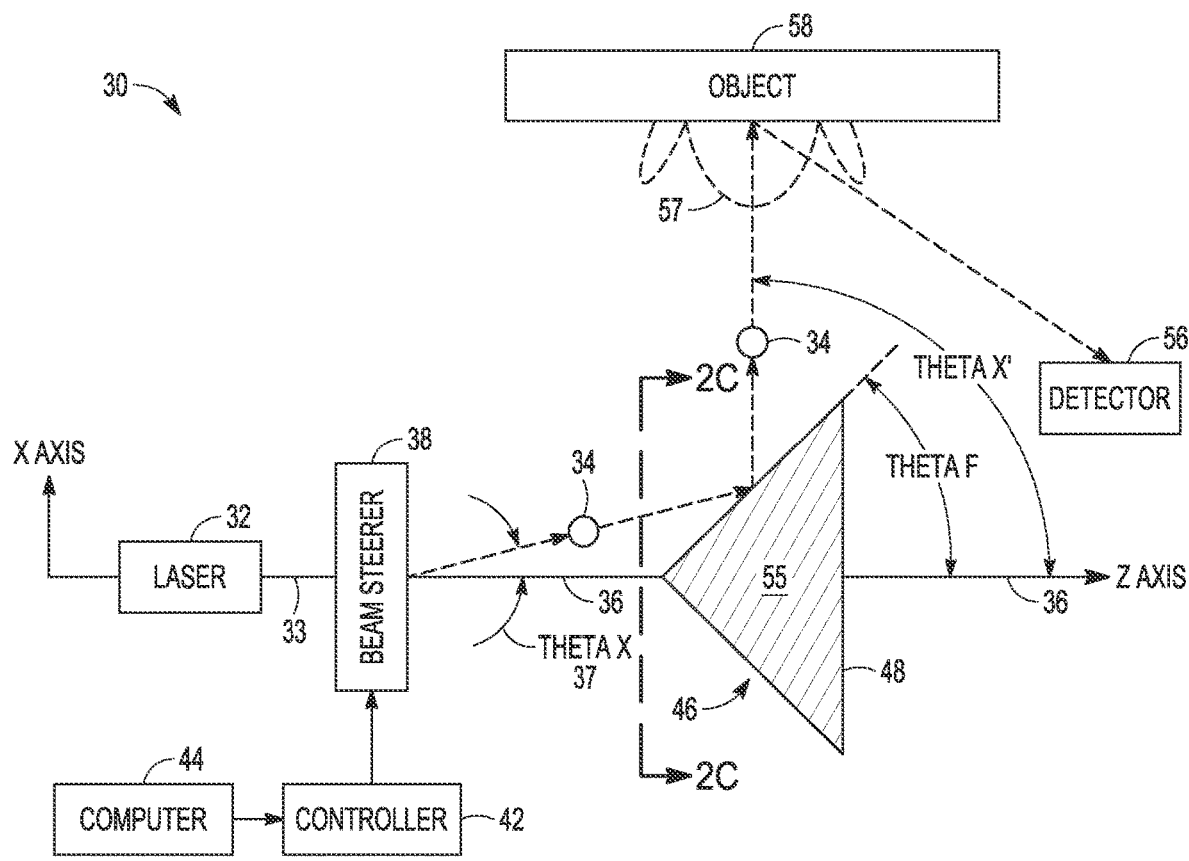
FIGS. 2A-2D are top, side, and section views of an embodiment of an actively steered situational awareness sensor.
Figure 2B:
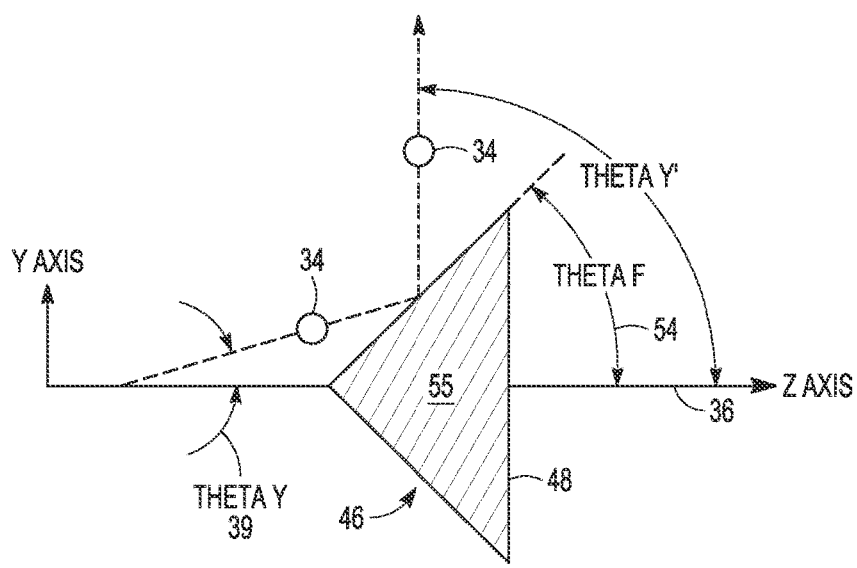
Figure 2C:
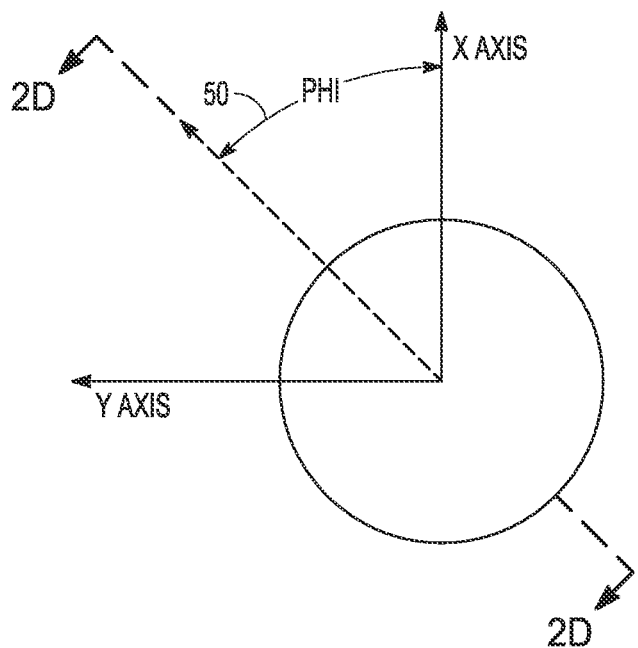
Figure 2D:
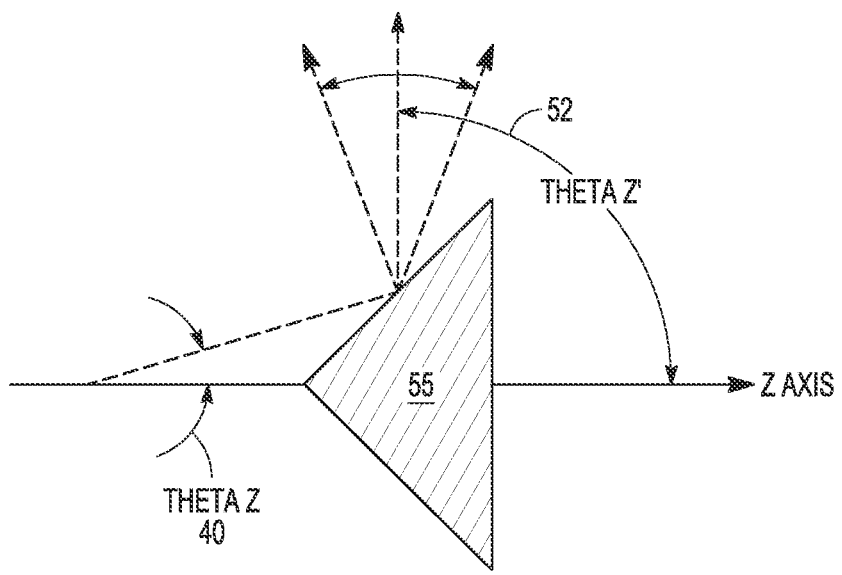

Referring now to FIG. 1, in an embodiment an unmanned ground vehicle (UGV) 10 is outfitted with an active situational awareness sensor 12. Sensor 12 is capable of scanning a spot-beam 14 over a 360° FOR 16 in angle Phi 18 and a defined FOR 20 in angle Theta Z' 22, typically 2 to 20 degrees. In a specific configuration, the FORs in angle Phi 18 and Theta Z' 22 correspond to horizontal and vertical FOR, respectively. In other embodiments, sensor 12 may be configured to scan a reduced FOR. For example, in some applications the sensor may need to only scan a forward 180° FOR. More simply, the sensor scans the spot-beam in angle Phi around the Z axis to scan a FOR (e.g. forward 180° or 360°) in the XY plane and in angle Theta Z' along the Z axis to scan the FOR in a plane perpendicular to the XY plane.

Sensor 12 comprises a laser, a beam steerer, a fixed mirror, a controller, a computer, various optical components and a detector housed in a structural housing 24. The beam steerer may be of an analog nature selected from one of a gimbaled mirror, a liquid crystal waveguide (LCWG) or a MEMS MMA or a discrete nature such as provided by an N-port optical switch. One or more apertures 26 are formed in housing 24 to facilitate scanning spot-beam 14 over the FOR. To scan the 360° FOR 16, the housing may have a single continuous ring aperture or multiple discrete apertures placed every 360/N degrees.

The laser (CW or pulsed) is configured to generate a beam of optical radiation. The beam steerer is oriented to nominally re-direct the beam along an optical axis in the Z direction and is responsive to command signals from the controller to focus the optical radiation to steer spot-beam 14 about the optical axis in two dimensions on the surface of the fixed mirror. The gimbaled mirror, LCWG and N-port optical switch beam steerers require an L1 optic, likely integrated into the switch, to form the spot-beam whereas MEMS MMA beam steers may form the spot-beam and forgo the L1 optic. The fixed mirror has a conical shape oriented along the optical axis and redirects the spot-beam 14 to a location Phi and Theta Z' in the FOR. The fixed mirror includes a MEMS MMA having a plurality of mirrors that in combination approximate the conical shape and tip and tilt to scan the spot-beam in Theta Z' to expand the FOR to plus or minus 30 degrees. For a discrete beam steerer, the mirrors also tip and tilt to scan the spot-beam in Phi to provide a continuous FOR in Phi. The various optical components are configured, at least in part, based on the particular aperture configuration of the sensor to scan the spot-beam 14 over the FOR. The detector is configured to sense a reflected component of the spot-beam, which can be processed to provide intensity or range.

The combination of the beam steerer and fixed mirror having a conical shape to focus and steer and redirect a laser spot-beam provides many advantages over known active situational awareness sensors. The SWaP-C benefits of using a single laser to produce a spot-beam over a 360 degree horizontal FOR and extended vertical FOR without rotary scanning systems are considerable. The use of a scanned spot-beam significantly reduces atmospheric backscatter, thus improving SNR. Whereas the rotary scanned sensors are limited to continuously scanning the same 360° horizontal FOR over and over, a LCWG or MEMS MMA steered sensor may rapidly scan a 360° horizontal FOR with a specified vertical FOR or any portion thereof, move discretely between multiple specific objects per frame, vary the dwell time on an object or compensate for other external factors to tailor the scan to a particular application or changing conditions in real-time.

U.S. Pat. No. 8,380,025 entitled "Liquid Crystal Waveguide Having Refractive Shapes for Dynamically Controlling Light" assigned to Vescent Photonics, Inc. is hereby incorporated by reference. The patent discloses a LCWG that is configurable to form and scan a laser spot over a FOV in a frame time. A time varying voltage is applied to the LCWG to modulate the liquid crystal material in order to form and position the laser spot according to the specified scan pattern. Liquid crystal waveguides dynamically control the refraction of light. Generally, liquid crystal materials may be disposed within a waveguide in a cladding proximate or adjacent to a core layer of the waveguide. In one example, portions of the liquid crystal material can be modulated to form refractive optical component shapes (e.g. lenses or prisms) in the cladding that interact with a portion (specifically the evanescent field) of light in the waveguide so as to permit electronic control of the refraction/bending, focusing, or defocusing of light as it travels through the waveguide.

Figure 5A:
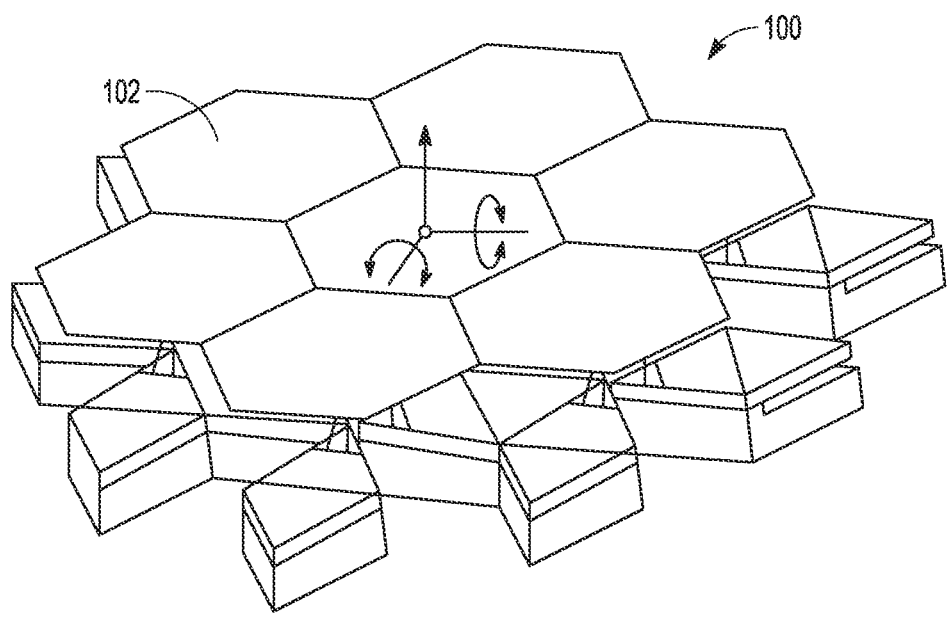
FIGS. 5A-5B are illustrations of a known embodiment of a Tip/Tilt/Piston ("TTP") MEMS MMA and a single mirror actuated to tip, tilt and piston.
Figure 5B:
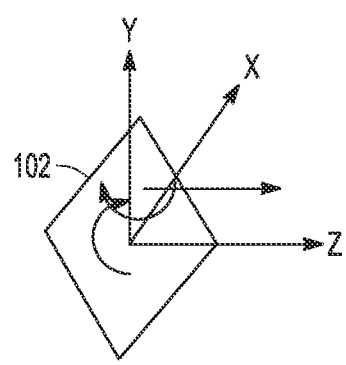

As best shown in FIGS. 5A-5B, a Micro-Electro-Mechanical System (MEMS) Micro-Mirror Array (MMA) 100 comprises a plurality of independently and continuously controllable mirrors 102 to re-direct optical radiation to focus and steer the optical beam(s). Each mirror is capable of at least "Tip" (rotation about an X-axis), "Tilt" (rotation about a Y-axis and "Piston" (translation along a Z-axis, perpendicular to the XY plane) where the X, Y and Z are orthogonal axes in a three-dimensional space. The Piston capability can be used generically speaking to "shape" the beam(s) that are reflected off of the MEMS MMA.

More specifically, in a reflective mode configuration it is important that the MEMS MMA re-directs and focuses the incident optical radiation into a small spot-beam on the conical shape of the fixed mirror consistently over the scanned FOR As will be described later, this is accomplished with mirrors that approximate an off-axis section (an "OAP") of a parabolic surface. This may be achieved either via tip, tilt and piston or with a substrate(s) that has a shape that approximates the section of the parabolic surface. The later approach is more difficult to fabricate but preserves the dynamic range of the mirrors for other focusing and beam-steering tasks.

The piston capability can also be used to perform other beam shaping functions such as to adjust the size, divergence or intensity profile of the spot-beam, produce deviations in the wavefront of the beam to compensate for atmospheric distortions, adjust phase to maintain a zero phase difference across the beam, add optical power to the beam or to improve the formation and steering of the beam by approximating a continuous surface across the micro-mirrors, which reduces unwanted diffraction to increase power in the f optical beam.

The MEMS MMA is preferably capable of tipping and tilting over range of at least −15° x+15° to steer over a range of +/−30°×30° and pistoning (translating) over a range of at least +/−15 microns (at least one-half wavelength in either direction) piston at a rate of at least 1 KHz (<1 millisecond). The independently controllable mirrors can be adaptively segmented to form any number of spot-beams, adjust the size/power of a given spot-beam, generate multi-spectral optical beams and to combine multiple input sources. Further, the MEMS MMA must have a sufficient number of mirrors, mirror size/resolution, fill factor, range of motion, response time, response accuracy and uniformity across the array.

Figure 3:
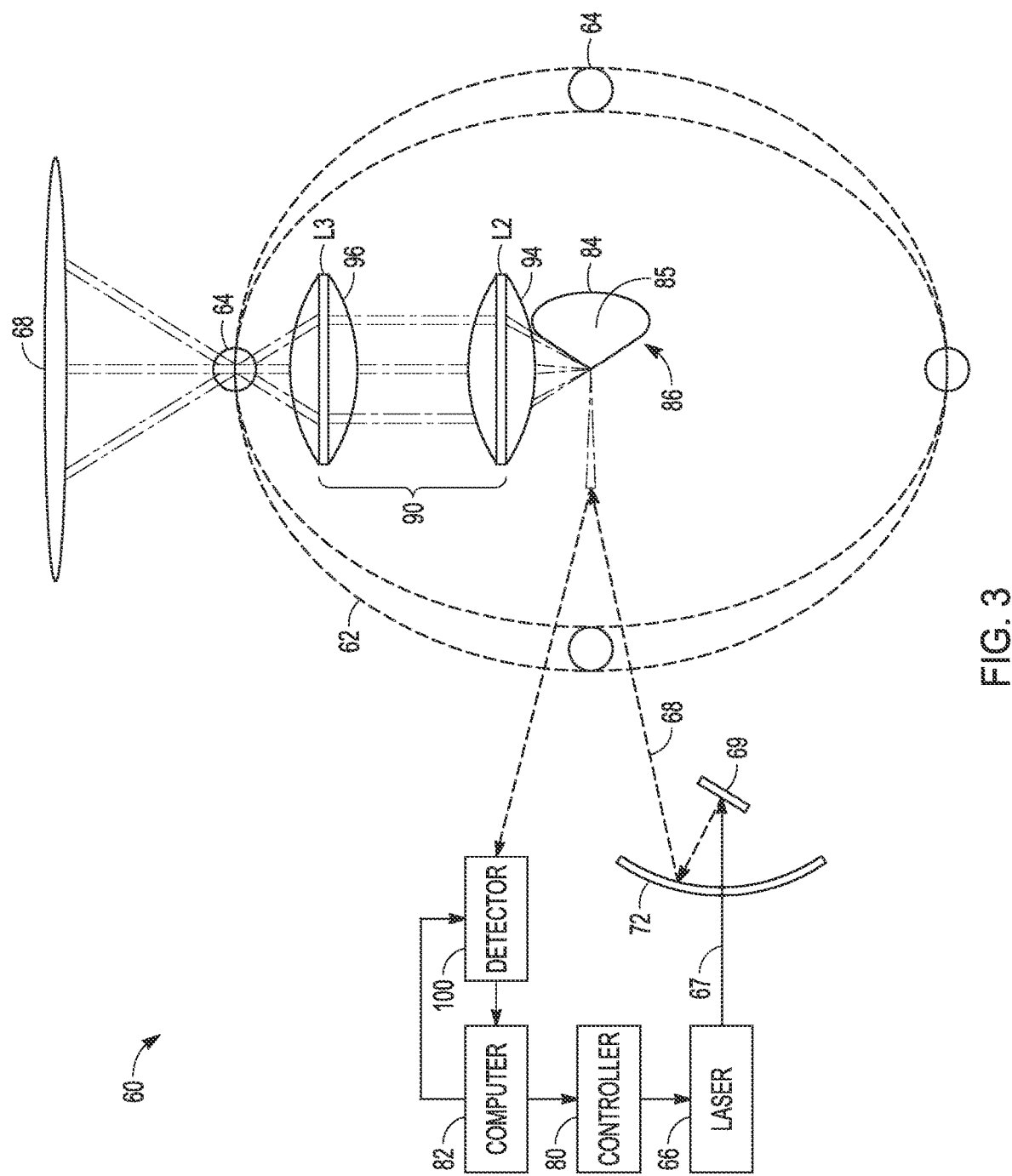
FIG. 3 is a diagram of another embodiment of a MEMS MMA steered situational awareness sensor including optics L2 and L3 for scanning the redirected spot-beam through discrete apertures.
Figure 4C:
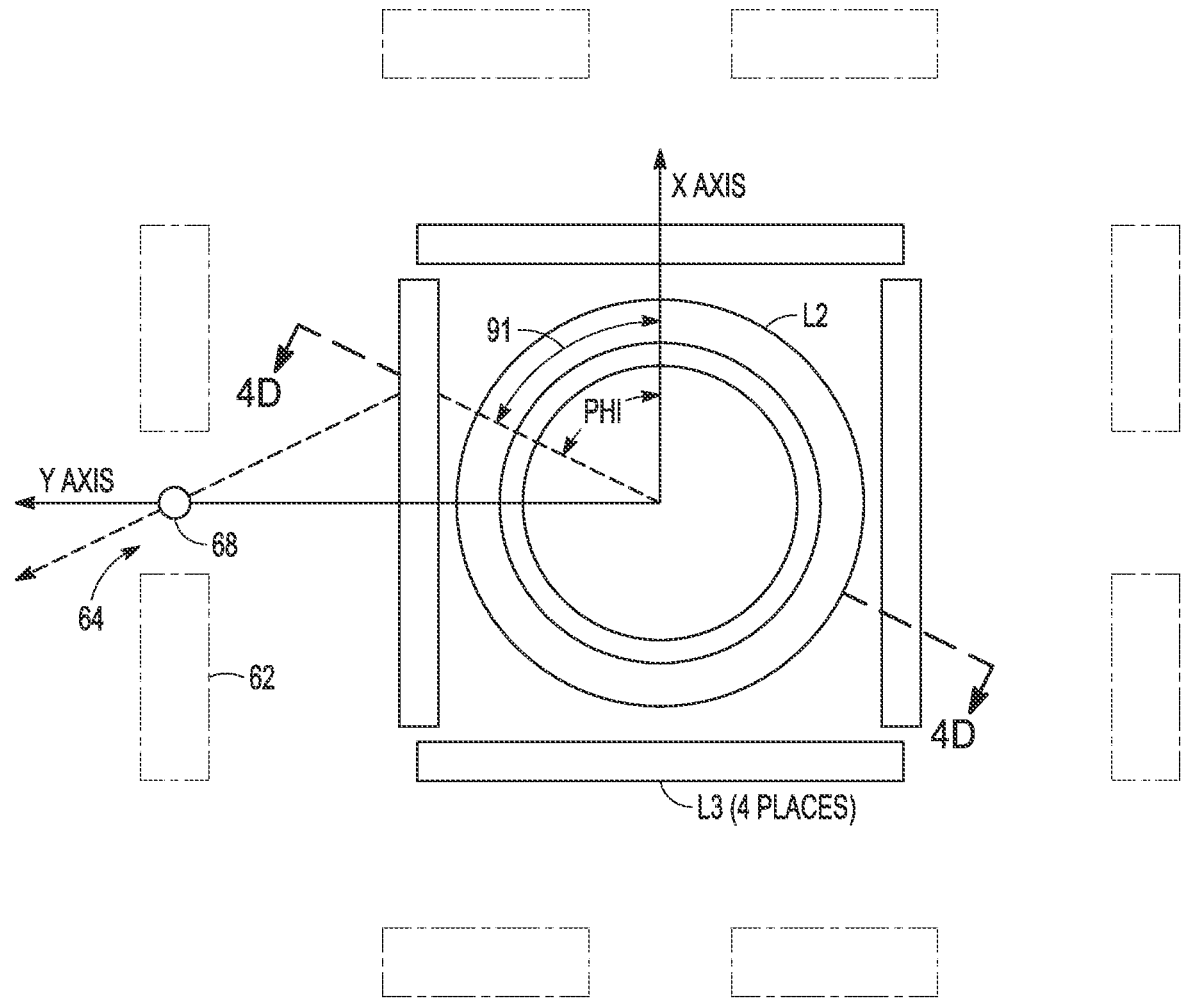
Figure 4D:
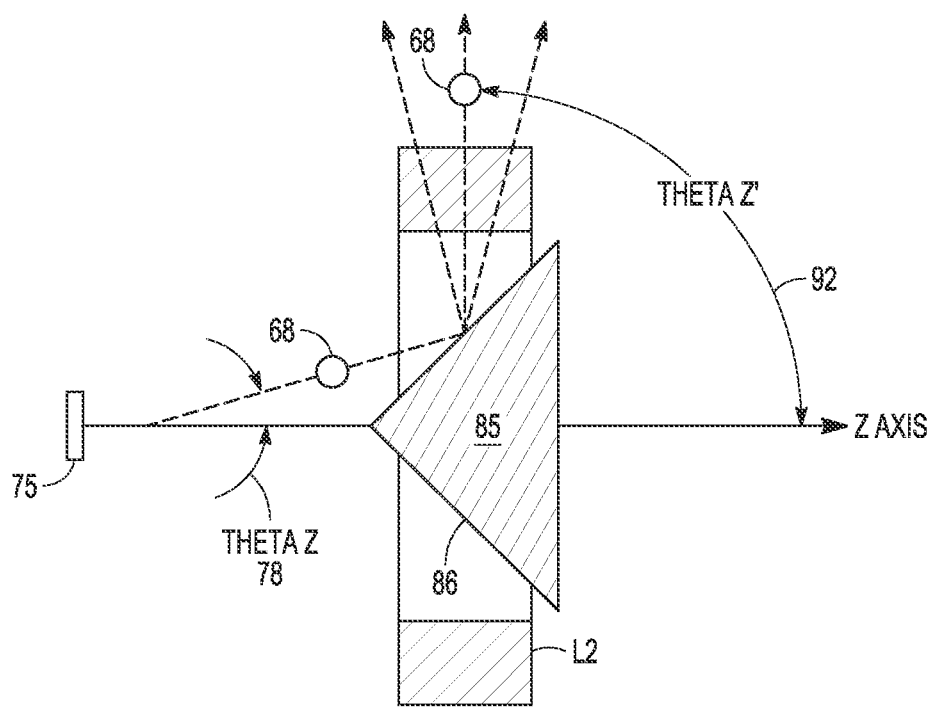

One such MEMS MMA is described in U.S. Pat. No. 10,444,492 entitled "Flexure-Based, Tip-Tilt-Piston Actuation Micro-Array", which is hereby incorporated by reference. As shown in FIGS. 1-3 of the '492 patent this MEMS MMA uses flexures to support each mirror at three fulcrum points (or vertices) of an equilateral triangle. The three different pairs of fulcrum points define three axes at 60 degrees to one another in the XY plane. Each mirror pivots about each axis to produce tip, tilt and piston in the XYZ space. This MEMS MMA is currently being commercialized by Bright Silicon technologies for "digitally controlling light."

Referring now to FIGS. 2A through 2D, an embodiment of an active situational awareness sensor 30 comprises a laser 32 configured to generate a beam 33 of optical radiation. A beam steerer 38 is oriented to nominally re-direct optical radiation along an optical axis 36 in the Z direction and is responsive to command signals to focus the optical radiation to form and steer a spot-beam 34 about the optical axis to a location Theta X 37 and Theta Y 39 from the optical axis. Theta X is the angle between the projection of the instantaneous location of the axis of the spot-beam on the X-Z plane and the Z-axis and Theta Y is the angle between the instantaneous location of the axis of the spot-beam on the Y-Z plane and the Z-axis. Theta Z 40 is the angle between the projection of the instantaneous location of the axis of the steered spot-beam and the Z-axis.

Because of the rotational symmetry, the position of the X-axis is, more or less, arbitrary. In this description, X is parallel to the "in plane" steering direction and Y is parallel to the "out of plane" steering direction. Making X parallel to the in plane steering direction simplifies the description, but it does not have to be in this location, there is a straightforward transform to relate any choice of X to the in plane steering direction.

A controller 42 is configured to issue command signals to the beam steerer 38 to steer the spot-beam 34 to the desired Theta X and Theta Y. A computer 44 is configured to issue signals to the controller 42 that provide the desired Theta X and Theta Y to implement a continuous scan, illumination of multiple discrete objects, variable dwell time, compensation for an external signal etc.

A fixed mirror 46 has a conical shape 48 oriented along the optical axis 36 (coincident with or offset from in different configurations) to redirect the spot-beam 34 to a location Phi 50 and Theta Z' 52 where Phi is the angle between the projection of the instantaneous location of the axis of the redirected spot-beam on the X-Y plane and the X-axis and Theta Z' is the angle between the projection of the instantaneous location of the axis of the redirected spot-beam and the Z-axis. Theta Z' 52 is greater than Theta Z 40. The redirected spot-beam 34 scans a FOR defined by the values of Phi and Theta Z'. Theta X is the angle between the projection of the instantaneous location of the axis of the redirected spot-beam on the X-Y plane and the Z-axis and Theta Y is the angle between the instantaneous location of the axis of the redirected and the Z-axis.

Steering spot-beam 34 in a circle (i.e. a constant Theta Z) around the conical shape scans the redirected spot-beam 34 around a 360° FOR in Phi. Varying the deflection of the MMA so that light is incident on a different section of the parabolic mirror (or scanning a line along the cone) scans the redirected spot-beam 34 in a defined FOR in Theta Z'. The angle Theta F 54 of the conical shape 48 of fixed mirror 46 may or may not be configured such that the spot-beam 34 is redirected perpendicular to optical axis 36. When Theta F produces a Theta Z' perpendicular to the Z-axis, the situational awareness sensor has a two-dimensional band of coverage comprised of Phi and Theta Z' that is centered on the Z axis along with the fixed mirror 46. Increasing or decreasing Theta F increases or decreases the nominal Theta Z', respectively. This shifts the two-dimensional band of coverage comprised of Phi and Theta Z' along the Z axis.

Fixed mirror 46 comprises a Micro-Electro-Mechanical System (MEMS) Micro-Mirror Array (MMA) 55 including a plurality of mirrors that in combination approximate the conical shape 48. The mirrors are responsive to command signals from the controller to tip and tilt to scan the spot-beam 34 in in Theta Z' along the optical axis to expand the FOR in Theta Z'. For an N-port optical switch beam steerer, the mirrors also tip and tilt to scan in Phi to provide a continuous FOR in Phi. The mirrors may also have the capability to "piston", which can be used alone or in combination with the tip and tilt of the mirrors to shape the spot-beam 34. The fixed mirror 46 is fixed in the sense that the entire optical component is fixed, although the individual mirrors move in tip, tilt and piston relative to the conic shape of the fixed mirror.

The ability to control the redirection of the spot-beam in both Phi and Theta Z' allows the total FOR of the sensor to be optimized. For example, if the FOR is a volume on top of a flat surface the sensor can be placed near the surface and the spot-beam directed perpendicular to the optical axis to maximize the volume of the FOR. In a second example, if the FOR is a circularly shaped region (perimeter) on top of a flat surface, the sensor can be placed above the ground and the spot-beam directed down to scan the circularly shaped region of interest. In a third example, if the sensor is in the front of a moving vehicle, the sensor axis can be directed in the forward direction and the spot-beam directed up to scan the volume in front of the moving vehicle to detect objects in front of the vehicle.

A detector 56 is configured to sense a reflected component 57 of the spot-beam reflected from an object 58. The reflected component may be processed to provide an intensity of the illuminated object or a range to the illuminated object.

The fixed mirror 46 has a "conical shape" 48, which is defined as "of, relating to, or shaped like a cone." A cone is a three dimensional geometric shape described by a circular base, an axis perpendicular to a circular base, an apex located on the axis, and a surface that is the locus of straight lines from the apex to the perimeter of the circular base (C1). A "normal" cone (CN1) is a cone in which the axis intersects the base in the center of the circle and the surface is rotationally symmetric about the axis.

A piecewise linear approximation (P1) of a cone (C1 or CN1) is three dimensional geometric shape described by a base that is a polygon with 3 or more sides, an axis perpendicular to the base, an apex located on the axis and a surface that is the locus of straight lines from the apex to perimeter of the base. If the axis is located at the center of the polygon, the geometric shape is rotationally symmetric about the axis. This may also be referred to as a "pyramid".

A cone (C1 or CN1) plus a powered optic (C2) is a three dimensional geometric shape described by a circular base, an axis perpendicular to the base, an apex located on the axis and a surface that is the locus of lines that curve in planes that are parallel to the axis from the apex to perimeter of the base. Because the mirror's surface is curved, the spot size is actually different at different locations on the mirror. This causes some distortions in the far field and extra beam divergence. Using an aspherical surface helps correct this. The effect is reduced with more apertures.

A PWL approximation of a cone (C1 or CN1) plus a powered optic (P2) is a three dimensional geometric shape described by a base that is a polygon with 3 or more sides, an axis perpendicular to the base, an apex located on the axis and a surface that is the locus of lines that curve in planes that are parallel to the axis from the apex to perimeter of the base.

A truncated cone (C3) is a three dimensional geometric shape described by a circular base, an axis perpendicular to the base, a top described by a circle and a surface that is the locus of straight lines parallel to the axis from the perimeter of the top to perimeter of the base.

A truncated PWL approximation of a cone (P3) is a three dimensional geometric shape described by a base that is a polygon with 3 or more sides, an axis perpendicular to the base, a top described by a polygon of 3 or more sides and a surface that is the locus of straight lines from the perimeter of the top to perimeter of the base.

A truncated cone plus a powered optic (C4) is a three dimensional geometric shape described by a circular base, an axis perpendicular to the base that intersects the base in the center of the circle, a top described by a circle and a surface that is the locus of lines that curve in planes that are parallel to the axis from the perimeter of the top to perimeter of the base.

A truncated PWL approximation of a cone plus a powered optic (P4) is a three dimensional geometric shape described by a base that is a polygon with 3 or more sides, an axis perpendicular to the base, a top described by a polygon of 3 or more sides and a surface that is the locus of lines that curve in planes that are parallel to the axis from the perimeter of the top to perimeter of the base.

Any of the above conical shapes can be combined to create an acceptable conical shape for the fixed mirror (i.e. a polygon base with a curved surface formed by the locus of curved lines from the apex to the perimeter of the polygon base).

Any of the above conical shapes are subject to manufacturing tolerances of the fixed mirror. A conical shape, such as a normal cone, that is designed to be rotationally symmetric about the axis may deviate from such symmetry within the manufacturing tolerances. Alternately, a conical shape may be designed with the axis intentionally offset from the center of the base (circle or polygon) in order to scan a particular FOR. Another alternative is to use the beam steerer to vary Theta Z as a function of Phi in order to scan a particular FOR with any conical shape.

Referring now to FIGS. 3 and 4A through 4D, an embodiment of an active situational awareness sensor 60 comprises a housing 62 having four discrete apertures 64 formed about its circumference at 90° (360°/4) intervals. The housing comprises a structural member configured to provide support primarily in the direction parallel to the sensor axis.

A laser 66 is configured to generate a beam 67 of optical radiation that passes through a hole in the center of a parabolic mirror 72 and onto a MEMS MMA 69 at an angle of incidence. MEMS MMA 69 re-directs beam 67 back onto parabolic mirror 72. Parabolic mirror 72 is oriented to nominally re-direct optical radiation along an optical axis 70 that is oriented in the Z direction. MEMS MMA 69 is responsive to command signals to re-direct the optical radiation onto a particular off-axis section, OPA, of the parabolic mirror 72, which in turn focuses and steers a spot-beam 68 about the optical axis to a location Theta X 74 and Theta Y 76 from the optical axis. Optical element 75 represents a combination of MEMS MMA 69 and parabolic mirror 72 that provide the beam steerer in an unfolded optical system to illustrate the origin of the spot-beam 68 from the optical axis. Theta X is the angle between the projection of the instantaneous location of the axis of the spot-beam on the X-Y plane and the Z-axis and Theta Y is the angle between the instantaneous location of the axis of the spot-beam and the Z-axis such that Theta X is in the plane of the X-axis and Theta Y is in the plane of the Y-axis. Theta Z 78 is the angle between the projection of the instantaneous location of the axis of the steered spot-beam and the Z-axis. Because of the rotational symmetry, the position of the X axis is, more or less, arbitrary.

A controller 80 is configured to issue command signals to the MEMS MMA 72 to steer the spot-beam 68 to the desired Theta X and Theta Y. A computer 82 is configured to issue signals to the controller 80 that provide the desired Theta X and Theta Y to implement a continuous scan, illumination of multiple discrete objects, variable dwell time, compensation for an external signal etc.

A fixed mirror 84 has a conical shape 86 that is oriented along the optical axis 70 in the Z direction. In this particular configuration, conical shape 86 is a normal cone (CN1) that is rotationally symmetric about its axis, which is coincident with the optical axis 70. The tip of the cone is positioned towards the MEMS MMA with the radius of the cone increasing along the axis away from the MEMS MMA. MEMS MMA is suitably configured so that its focus is at the conical shape of the fixed mirror. This creates the minimum spot size on the conical surface. Since the round beam is actually being projected onto a curved surface, there is distortion of the beam due to the mirror's surface. Keeping the spot small makes the spot project on a "localized flat" surface. Rather than an entire cone, the fixed mirror 84 may have an annular conical shape (a section of the cone) on which the spot-beam is steered. The unused portions of the cone are not necessary. For packaging reasons, e.g., to circumvent structure and electronics, a fold mirror(s) may be placed between parabolic mirror 72 and fixed mirror 84. The parabolic mirror may be tilted and the axis of the fixed mirror aligned, on-axis or off-axis, to the axis of the parabolic mirror.

Fixed mirror 84 comprises a Micro-Electro-Mechanical System (MEMS) Micro-Mirror Array (MMA) 85 including a plurality of mirrors that in combination approximate the conical shape 86. The mirrors are responsive to command signals from the controller to tip and tilt to scan the spot-beam 68 in in Theta Z' along the optical axis to expand the FOR in Theta Z'. The mirrors may also have the capability to "piston", which can be used alone or in combination with the tip and tilt of the mirrors to shape the spot-beam 68.

Four optical channels 90 are positioned between fixed mirror 84 and a different one of the apertures 64 in the housing 62 to guide the redirected spot-beam 68 through the corresponding aperture 64 to a location Phi 91 and Theta Z' 92 where Phi is the angle between the projection of the instantaneous location of the axis of the redirected spot-beam on the X-Y plane and the X axis and Theta Z' is the angle between the projection of the instantaneous location of the axis of redirected spot-beam on the Z axis. Theta Z' 92 is greater than Theta Z 78. The redirected spot-beam 68 scans a FOR defined by the values of Phi and Theta Z'.

Each optical channel 90 comprises an optic L2 94 and an optic L3 96. Optic L2 is of larger diameter to collect diverging light coming off the mirror at +/−45 degrees (nominally). A smaller optic is achieved using more and smaller apertures. Optic L2 is placed at approximately its focal length from the mirror to collimate the light. Optic L3 is a fast (low F/#, short focal length) lens that quickly causes the light to cross and diverge out of the aperture. Note, in certain embodiments a portion of the re-collimation performed by L2/L3 may be done using the MEMS MMA 85, particularly using its piston capability to shape the spot-beam. This reduces some of the optical power requirements of L2/L3, with the potential to eliminate the optics altogether.

Steering spot-beam 68 in a circle (constant Theta Z) around the conical shape scans the redirected spot-beam 68 from one aperture 64 to the next around a 360° FOR in Phi. Varying the radius of the circle scans the redirected spot-beam 68 in a defined FOR in Theta Z'. MEMS MMA 85 extends the FOR in Theta Z'. The angle Theta F 98 of the conical shape 86 of fixed mirror 84 may or may not be configured such that the spot-beam 64 is redirected perpendicular to optical axis 70.

A detector 100, suitably a non-imaging detector, is configured to sense a reflected component of the spot-beam. The reflected component may be processed to provide an intensity of the illuminated object or a range to the illuminated object.

In order to properly form the spot-beam in a small spot on the conical surface of the fixed mirror so that the shape of the spot-beam remains consistent (e.g., avoids asymmetrical stretching/compression) as it scans around the mirror, it is critical that the spot-beam is focused onto the conical mirror. If not properly focused, the larger spot projected onto the conical surface will reflect light into a fan, rather than another spot-beam. The off-axis sections of parabolic mirror 72 perform this function. The MEMS MMA 69 may provide additional focusing of the spot-beam to define a smaller or spot or to maintain focus as the beam is steered to different locations of the conical mirror.

Referring now to FIGS. 6A and 6B, a fixed mirror 110 comprises at least three (4 in FIG. 6A and 8 in FIG. 6B) triangular-shaped planar MEMS MMAs 112 configured to form an N-sided pyramid that approximates the conic shape of the fixed mirror. More formally, the pyramid is a piecewise linear approximation (Pl) of a cone as previously defined. The fewer number of triangular-shaped sections, the more angular Phi region each section must cover. For example, for three sections, each section has to cover 120 deg in Phi. At the corners of the section, tip, tilt and piston may be limited to adjust the beam and the cone will pickup edge diffraction.

Referring now to the FIG. 7, a fixed mirror 120 comprises one or more MEMS MMAs 122 formed on a flexible substrate and wrapped on a conic mandrel 124 to approximate the conic shape of the fixed mirror.

Figure 8:
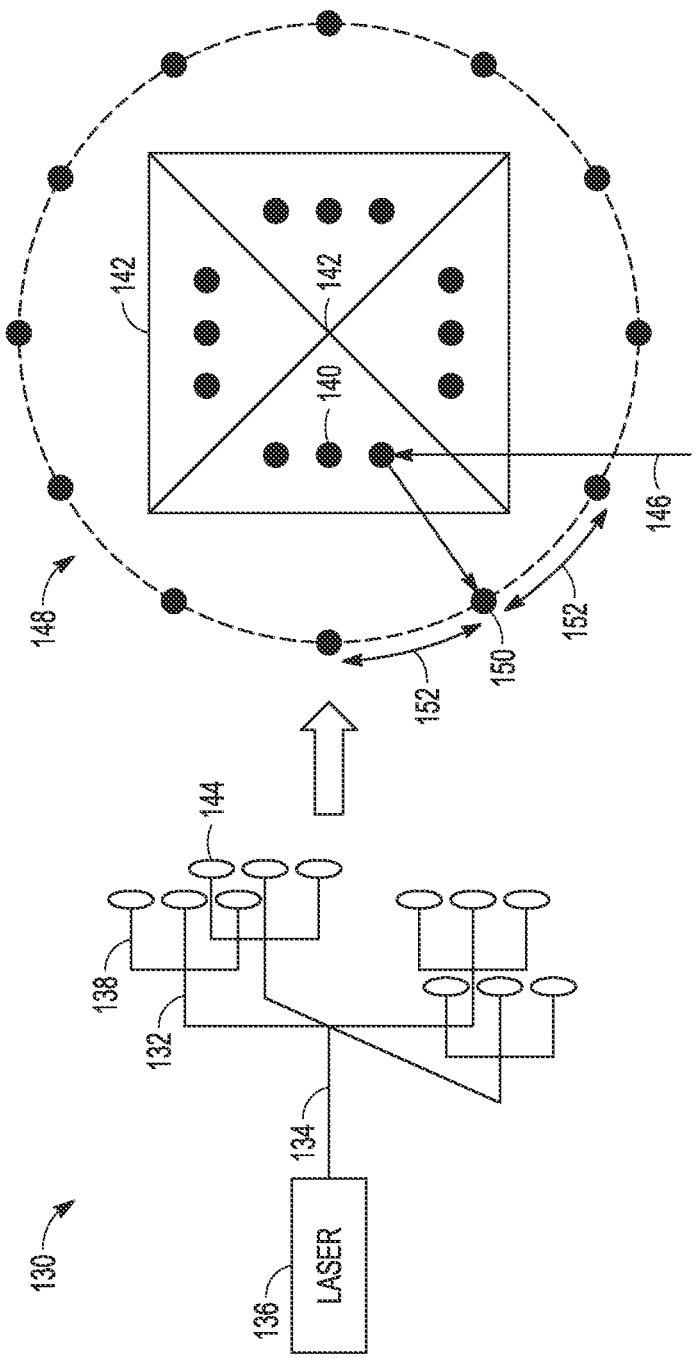
FIG. 8 is a diagram of a discrete beam steerer comprising an N-port optical switch to steer the spot-beam at discrete angles onto the conic shape of the fixed mirror.

Referring now to FIG. 8, a beam steerer 130 may comprise an N-port optical switch 132 configured to receive a beam 134 from a laser 136 and selectively route the beam from 1 of N ports 138 at discrete steering angles 140 about the optical axis 141 spaced around the conical shape of the fixed mirror 142 and focus (via, for example, an L1 focusing optic 144 at each port) the optical radiation into a spot-beam 146 on the conical shape of the fixed mirror. The fixed mirror re-directs the spot-beam to scan a field-of-regard (FOR) 148 at discrete scan angles 150 in Phi around the optical axis. The MEMS MMA's mirrors that approximate the conic shape of the fixed mirror is responsive to command signals to tip and tilt to scan 152 the spot-beam 146 in Phi to span the discrete scan angles and provide a continuous FOR 148 in the Phi.

Figure 9:
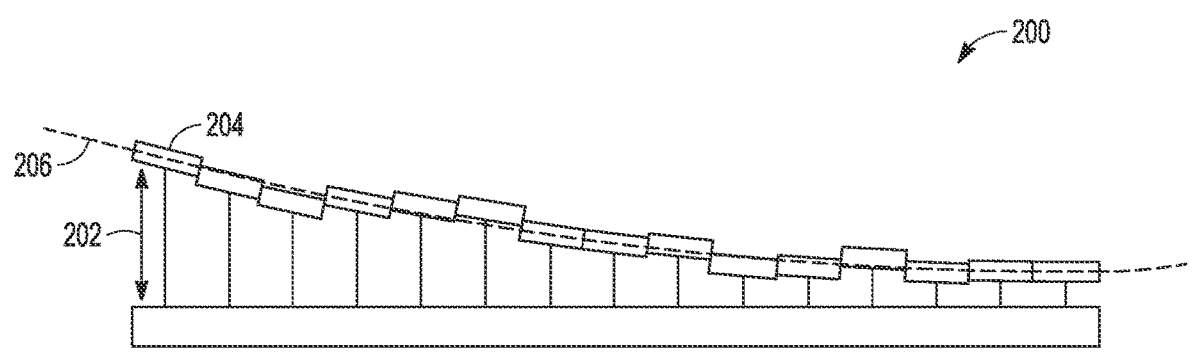
FIG. 9 is an illustration of using the piston capability to shape the spot-beam.

As previously mentioned, the MMA's piston capability can be generally used to "shape" the optical radiation or spot-beam. In addition to scanning the spot-beam in Theta Z' or Phi, the piston can be used to perform other optical functions on the spot-beam concurrently. As illustrated in FIG. 9, responsive to command signals a MEMS MMA 200 can adjust the piston 202 of mirrors 204 to induce deviations from a continuous steering surface 206. This can be done to compensate for path length variation of the spot-beam (to maintain zero phase across the beam), to correct for atmospheric distortion or both. Adjustments for path length variation can be calibrated offline and stored in a lookup table (LUT) as a function of scan angle. Adjustments for atmospheric distortion are done in real-time during operation of the active imaging system. For wavefront correction, a source emits optical energy in a similar band to illumination e.g., SWIR a beam steerer scans the optical beam onto scene. A wavefront sensor measures the wavefront of the reflected beam to determine the effects of atmospheric distortion. A controller computes the requisite piston adjustments required to correct the wavefront and provides them as command signals to the MEMS MMA. In high quality, high performing active imaging systems, the ability to accurately remove the effects of path length variation and atmospheric distortion is critical to achieving useful imagery of the scene, and important features identified within the scene. Piston 202 can also be used to perform some of the collimation done by optics L2 and L3 to reduce or eliminate those elements.

Figure 10A:
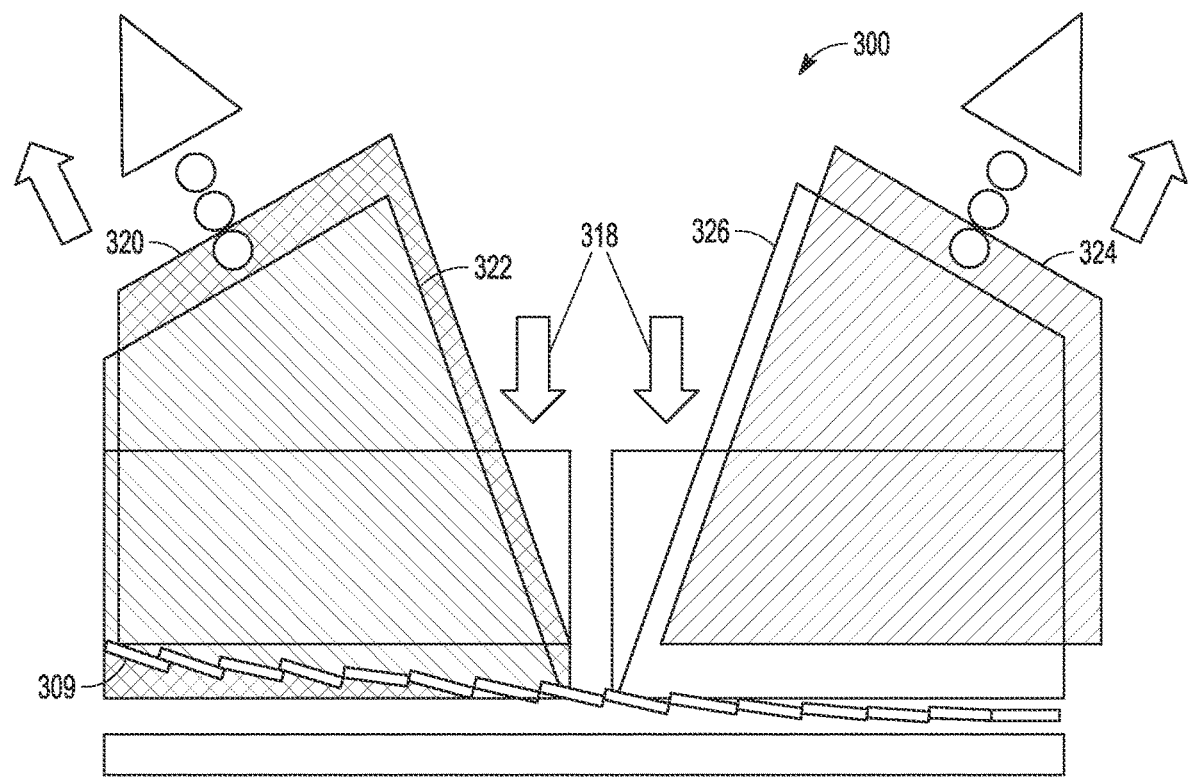
Figure 10B:
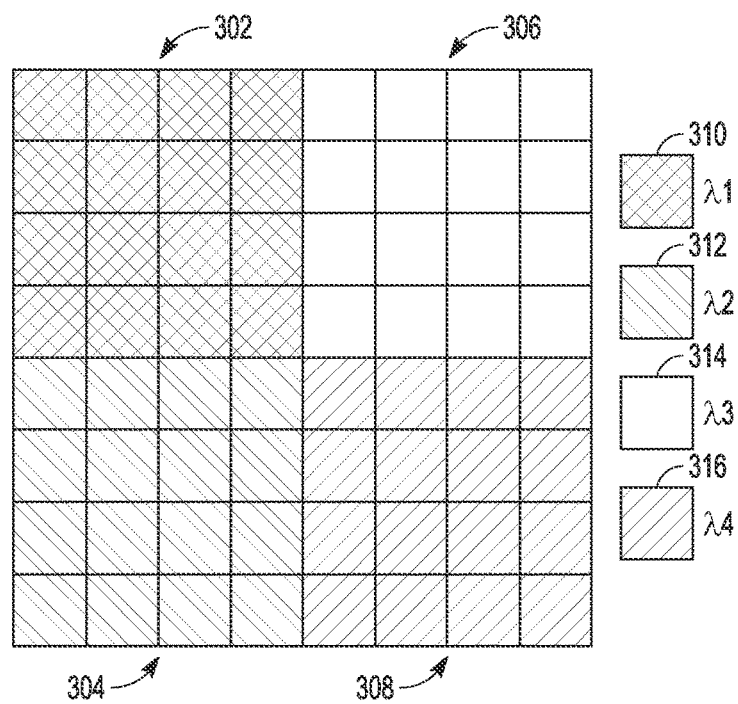
Figure 10C:
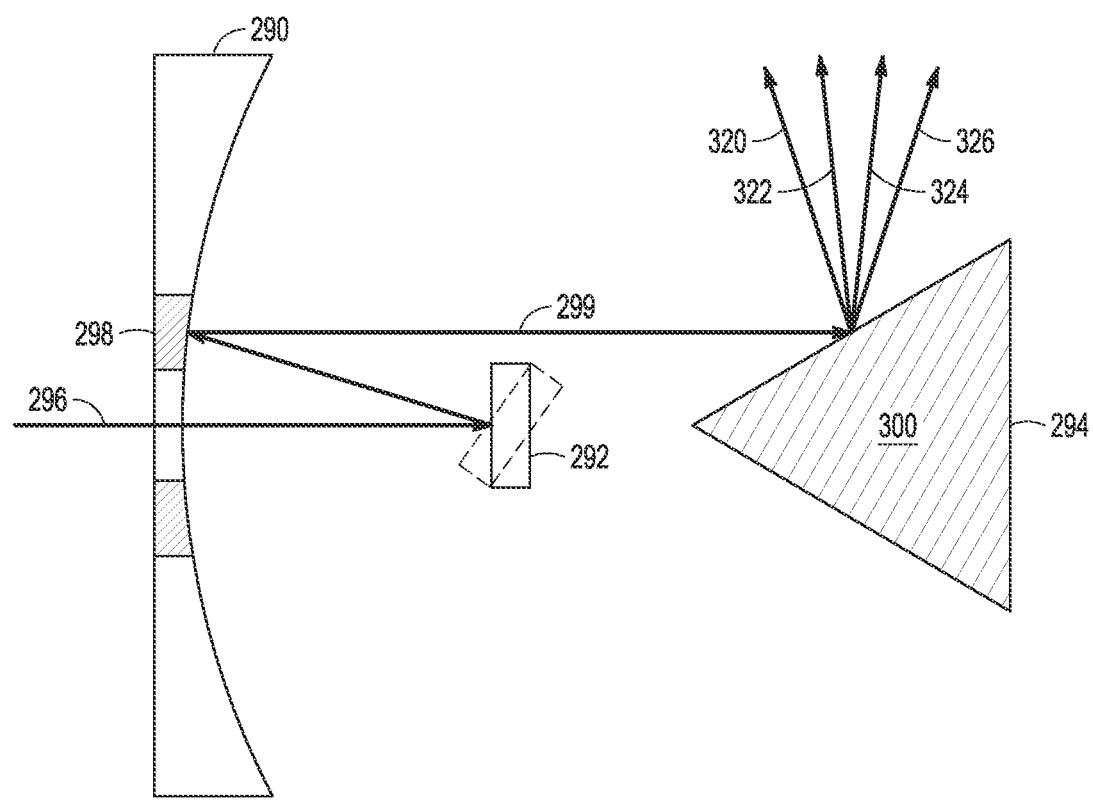

As illustrated in FIGS. 10A-10C, a beam steerer includes a parabolic mirror 290, a steering MEMS MMA 292 and a fixed mirror 294 having a conic shape. A beam 296 passes through the center of the parabolic mirror onto the steering MEMS MMA 292, which re-directs the beam onto a particular off-axis section 298 of the parabolic mirror, which focus the beam into a spot-beam 299 on the conic shape of the fixed mirror. Responsive to command signals from the controller, the fixed mirror's MEMS MMA 300 is partitioned into four segments 302, 304, 306 and 308 each including a plurality of mirrors 309 illuminated by optical radiation 318. The mirrors in the different sections are provided with reflective coatings 310, 312, 314 and 316 at different wavelengths. In response to command signals, the MEMS MMA tips/tilts/pistons the mirrors in each segment to independently scan optical beams 320, 322, 324 and 326 over different portions of the FOR about the optical axis. In an embodiment, one or more beams are used to scan a repetitive pattern in a 360 degree FOR around the optical axis to detect objects and one or more beams are used to scan the locations of the detected objects w % bile the initial 360 degree scan is ongoing. The scans may contain the same or different wavelength compositions. For example, the repetitive scan could be a broad spectral scan and the location specific scans could be narrow spectral scans.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A situational awareness sensor, comprising:
a laser configured to generate a beam of optical radiation;
a fixed mirror having a conical shape oriented along an optical axis;
a beam steerer responsive to command signals to focus the optical radiation into a spot-beam on the conical shape of the fixed mirror and steer the spot-beam in two-dimensions about the optical axis to re-direct the spot-beam to scan a field-of-regard (FOR) in a first angular direction around the optical axis;
said fixed mirror comprising a Micro-Electro-Mechanical System (MEMS) Micro-Mirror Array (MMA) including a plurality of mirrors that in combination approximate the conical shape, said mirrors responsive to command signals to tip and tilt to scan the spot-beam in a second angular direction along the optical axis to expand the FOR in the second angular direction; and
a detector configured to sense a reflected component of the spot-beam,
wherein the beam steerer responsive to command signals steers the spot-beam axially along the conic shape of the fixed mirror to scan the FOR in the second angular direction, said FOR in the second angular direction being expanded by operation of the MEMS MMA.

2. The situational awareness sensor of claim 1, wherein the beam steerer comprises one of a gimbaled mirror, a liquid crystal waveguide (LCWG) or a steering MEMS MMA.

3. The situational awareness sensor of claim 1, wherein the beam steerer comprises an N-port optical switch configured to selectively route the beam from 1 of N ports at discrete steering angles about the optical axis spaced around the conical shape of the fixed mirror and focus the optical radiation into the spot-beam on the conical shape of the fixed mirror to re-direct the spot-beam to scan a field-of-regard (FOR) at discrete scan angles in a first angular direction around the optical axis, said MEMS MMA's mirrors responsive to command signals to tip and tilt to scan the spot-beam in the first angular direction to span the discrete scan angles and provide a continuous FOR in the first angular direction.

4. The situational awareness sensor of claim 1, wherein the fixed mirror comprises at least three triangular-shaped planar MEMS MMAs configured to form an N-sided pyramid that approximates the conic shape of the fixed mirror.

5. The situational awareness sensor of claim 1, wherein the fixed mirror comprises one or more MEMS MMAs formed on a flexible substrate and wrapped on a conic mandrel to approximate the conic shape of the fixed mirror.

6. A situational awareness sensor, comprising:
a laser configured to generate a beam of optical radiation;
a fixed mirror having a conical shape oriented along an optical axis;
a beam steerer responsive to command signals to focus the optical radiation into a spot-beam on the conical shape of the fixed mirror and steer the spot-beam in two-dimensions about the optical axis to re-direct the spot-beam to scan a field-of-regard (FOR) in a first angular direction around the optical axis;
said fixed mirror comprising a Micro-Electro-Mechanical System (MEMS) Micro-Mirror Array (MMA) including a plurality of mirrors that in combination approximate the conical shape, said mirrors responsive to command signals to tip and tilt to scan the spot-beam in a second angular direction along the optical axis to expand the FOR in the second angular direction; and
a detector configured to sense a reflected component of the spot-beam,
wherein the beam steerer comprises:
a parabolic mirror having a hole formed at its center through which the beam of optical radiation passes; and
a steering MEMS MMA positioned in front of the parabolic mirror to receive the beam, said steering MEMS MMA comprising one or more independent and continuously controlled mirrors that tip and tilt to steer the beam onto different off-axis sections of the parabolic mirror that focus the optical radiation into the spot-beam and steer the spot-beam about the optical axis.

7. The situational awareness sensor of claim 6, wherein the mirrors of the fixed mirror's MEMS MMA and the steering MEMSM MMA are further configured to piston to shape the spot-beam.

8. A situational awareness sensor, comprising:
a laser configured to generate a beam of optical radiation:
a fixed mirror having a conical shape oriented along an optical axis;
a beam steerer responsive to command signals to focus the optical radiation into a spot-beam on the conical shape of the fixed mirror and steer the spot-beam in two-dimensions about the optical axis to re-direct the spot-beam to scan a field-of-regard (FOR) in a first angular direction around the optical axis,
said fixed mirror comprising a Micro-Electro-Mechanical System (MEMS) Micro-Mirror Array (MMA) including a plurality of mirrors that in combination approximate the conical shape, said mirrors responsive to command signals to tip and tilt to scan the spot-beam in a second angular direction along the optical axis to expand the FOR in the second angular direction; and
a detector configured to sense a reflected component of the spot-beam, wherein the beam steerer comprises:
a steering MEMS MMA positioned to receive the beam at an angle of incidence, said steering MEMS MMA comprising a plurality of independent and continuously controlled mirrors that approximate an off-axis section of a parabolic surface to re-direct and focus the optical radiation into the spot-beam on the conical shape of the fixed mirror, said mirrors responsive to command signals to tip, tilt and piston each mirror to steer the spot-beam in two-dimensions about the optical axis.

9. The situational awareness sensor of claim 8, wherein the mirrors of the fixed mirror's MEMS MMA and the steering MEMS MMA are further configured to piston to shape the spot-beam.

10. A situational awareness sensor, comprising:
a laser configured to generate a beam of optical radiation;
a fixed mirror having a conical shape oriented along an optical axis;
a beam steerer responsive to command signals to focus the optical radiation into a spot-beam on the conical shape of the fixed mirror and steer the spot-beam in two-dimensions about the optical axis to re-direct the spot-beam to scan a field-of-regard (FOR) in a first angular direction around the optical axis;
said fixed mirror comprising a Micro-Electro-Mechanical System (MEMS) Micro-Mirror Array (MMA) including a plurality of mirrors that in combination approximate the conical shape, said mirrors responsive to command signals to tip, tilt and piston to scan and shape the spot-beam in a second angular direction along the optical axis to expand and scan the FOR in the second angular direction; and a detector configured to sense a reflected component of the spot-beam.

11. The situational awareness sensor of claim 10, wherein each said mirror rotates about X and Y orthogonal axes, respectively, and translates along a Z axis orthogonal to the XY plane to tip, tilt and piston, respectively.

12. The situational awareness sensor of claim 11, wherein each said mirror is supported at three vertices of a triangle, wherein lines defined by three different pairs of said vertices provide three axes at 60 degrees to one another in the XY plane, wherein each said mirror pivots about each said axes to produce tilt, tip and piston in an XYZ space.

13. The situational awareness sensor of claim 10, wherein the mirrors are configured to at least partially collimate the spot-beam.

14. The situational awareness sensor of claim 10, wherein said mirrors tip, tilt and piston to shape the spot-beam to perform one or more of the following:
   adjust a size, divergence or intensity profile of the spot-beam;
   produce deviations in the wavefront of the spot-beam to compensate for atmospheric distortion; and
   adjust the phase and maintain a zero phase difference across the spot-beam.

15. A situational awareness sensor, comprising:
   a laser configured to generate a beam of optical radiation;
   a fixed mirror having a conical shape oriented along an optical axis;
   a beam steerer responsive to command signals to focus the optical radiation into a spot-beam on the conical shape of the fixed mirror and steer the spot-beam in two-dimensions about the optical axis to re-direct the spot-beam to scan a field-of-regard (FOR) in a first angular direction around the optical axis;
   said fixed mirror comprising a Micro-Electro-Mechanical System (MEMS) Micro-Mirror Array (MMA) including a plurality of mirrors that in combination approximate the conical shape, said mirrors responsive to command signals to tip and tilt to scan the spot-beam in a second angular direction along the optical axis to expand the FOR in the second angular direction; and
   a detector configured to sense a reflected component of the spot-beam,
   wherein the MEMS MMA is partitioned into a plurality of segments illuminated by the spot-beam, each segment including at least one mirror, said MEMS MMA responsive to tip and tilt the mirrors in each segment to separate the spot-beam into a plurality of spot-beams to scan the FOR.

16. The situational awareness sensor of claim 15, wherein the MEMS MMA is partitioned into a plurality of segments illuminated by the spot-beam, each segment including at least one mirror, said MEMS MMA responsive to tip, tilt and piston the mirrors in each segment to separate the spot-beam into a plurality of spot-beams to scan the FOR.

17. A situational awareness sensor, comprising:
   a laser configured to generate a beam of optical radiation;
   a fixed mirror having a conical shape oriented along an optical axis;
   a beam steerer responsive to command signals to focus the optical radiation into a spot-beam on the conical shape of the fixed mirror and steer the spot-beam in two-dimensions about the optical axis to re-direct the spot-beam to scan a field-of-regard (FOR) in a first angular direction around the optical axis;
   said fixed mirror comprising a Micro-Electro-Mechanical System (MEMS) Micro-Mirror Array (MMA) including a plurality of mirrors that in combination approximate the conical shape, said mirrors responsive to command signals to tip and tilt scan the spot-beam in a second angular direction along the optical axis to expand the FOR in the second angular direction and to tip, tilt and piston to shape and at least partially collimate the spot-beam that scans the FOR; and
   a detector configured to sense a reflected component of the spot-beam.

* * * * *

UNITED STATES PATENT AND TRADEMARK OFFICE
CERTIFICATE OF CORRECTION

PATENT NO. : 12,372,623 B2  
APPLICATION NO. : 17/177784  
DATED : July 29, 2025  
INVENTOR(S) : Keller et al.

Page 1 of 1

It is certified that error appears in the above-identified patent and that said Letters Patent is hereby corrected as shown below:

In the Specification

In Column 1, Line 56, delete "mappig" and insert --mapping-- therefor

In Column 6, Line 48, after "FOR", insert --.--

In Column 7, Line 65, delete "X" and insert --X'-- therefor

In Column 8, Line 1, delete "Y" and insert --Y'-- therefor

In Column 10, Line 25, delete "72" and insert --69-- therefor

In Column 11, Line 27, delete "64" and insert --68-- therefor

In Column 12, Line 59, delete "w % bile" and insert --while-- therefor

In the Claims

In Column 14, Line 18, in Claim 7, delete "MEMSM" and insert --MEMS-- therefor

In Column 14, Line 21, in Claim 8, delete "radiation:" and insert --radiation;-- therefor In Column 14, Line 29, in Claim 8, delete "axis," and insert --axis;-- therefor Signed and Sealed this  
Twentieth Day of January, 2026

John A. Squires  
*Director of the United States Patent and Trademark Office*